US008899166B2

(12) United States Patent
Steinmann et al.

(10) Patent No.: US 8,899,166 B2
(45) Date of Patent: Dec. 2, 2014

(54) ACTIVE ADAPTIVE GYROSTABILISER CONTROL SYSTEM

(75) Inventors: Paul Douglas Steinmann, Fremantle (AU); Tristan Perez, Valentine (AU)

(73) Assignee: Veem Ltd., Canning Vale Western Australia (AU)

( * ) Notice: Subject to any disclaimer, the term of this patent is extended or adjusted under 35 U.S.C. 154(b) by 189 days.

(21) Appl. No.: 13/579,520

(22) PCT Filed: Feb. 17, 2011

(86) PCT No.: PCT/AU2011/000168
§ 371 (c)(1),
(2), (4) Date: Oct. 26, 2012

(87) PCT Pub. No.: WO2011/100796
PCT Pub. Date: Aug. 25, 2011

(65) Prior Publication Data
US 2013/0036959 A1  Feb. 14, 2013

(30) Foreign Application Priority Data

Feb. 17, 2010  (AU) .............................. 2010900643

(51) Int. Cl.
*B63B 39/04* (2006.01)
*G01C 21/18* (2006.01)

(52) U.S. Cl.
CPC ............... *B63B 39/04* (2013.01); *G01C 21/18* (2013.01)
USPC ....................................................... 114/122

(58) Field of Classification Search
USPC ........... 114/122; 74/5.1, 5.12, 5.34, 5.4, 5.47, 74/5.7; 482/44
See application file for complete search history.

(56) References Cited

U.S. PATENT DOCUMENTS

| 769,493 | A | 9/1904 | Schlick | |
|---|---|---|---|---|
| 2,790,119 | A | 4/1957 | Konet | |
| 3,280,642 | A | 10/1966 | Noxon | |
| 7,181,987 | B2 * | 2/2007 | Hamady | 74/5.12 |
| 7,451,667 | B2 * | 11/2008 | Hamady | 74/5.12 |
| 7,854,177 | B2 * | 12/2010 | Hamady | 74/5.12 |
| 2004/0244513 | A1 | 12/2004 | Adams et al. | |
| 2005/0274210 | A1 | 12/2005 | Adams | |
| 2013/0036958 | A1 | 2/2013 | Steinmann | |

FOREIGN PATENT DOCUMENTS

| WO | 2009/009074 | 1/2009 |
|---|---|---|
| WO | 2009/049371 | 4/2009 |

OTHER PUBLICATIONS

ISR for related PCT/AU2011/000168 mailed on Mar. 22, 2011.
IPRP for PCT/AU2011/000168 issued on Aug. 21, 2012.
Office Action mailed on Apr. 25, 2014 from related U.S. Appl. No. 13/579,517.

(Continued)

*Primary Examiner* — Lars A Olson
(74) *Attorney, Agent, or Firm* — Ladas & Parry, LLP

(57) ABSTRACT

A gyrostabilizer control system and method for stabilizing marine vessel motion based on precession information only. The control system employs an Automatic Gain Control (AGC) precession controller (60). This system operates with a gain factor that is always being gradually minimized so as to let the gyro flywheel (12) develop as much precession as possible—the higher the precession, the higher the roll stabilizing moment. This continuous gain change provides adaptation to changes in sea state and sailing conditions. The system effectively predicts the likelihood of maximum precession being reached. Should this event be detected, then the gain is rapidly increased so as to provide a breaking precession torque. Once the event has passed, the system again attempts to gradually decrease the gain.

26 Claims, 13 Drawing Sheets

(56) References Cited

OTHER PUBLICATIONS

PCT International Preliminary Report on Patentability (Chapter I) dated Aug. 21, 2012 from related PCT/AU2011/000169.

PCT Written Opinion of the International Search Authority dated Mar. 23, 2011 from related PCT/AU2011/000169.

PCT Search Report dated Mar. 23, 2011 from related PCT/AU2011/000169.

* cited by examiner

ACTIVE ADAPTIVE GYROSTABILISER CONTROL SYSTEM

CROSS-REFERENCE TO RELATED APPLICATIONS:

This application is the U.S. National Stage of International Patent Application No. PCT/AU2011/000168 filed on Feb. 17, 2011, which claims priority to Australian Patent Application No. 2010900643 filed on Feb. 17, 2010, the disclosures of which are hereby incorporated by reference in their entireties.

FIELD OF THE INVENTION

The present invention relates to a gyrostabiliser control system and method for stabilising marine vessel motion induced by wave and environmental excitation forces that produce roll motion and relates more particularly, though not exclusively, to an active adaptive gyrostabiliser control system and method.

BACKGROUND TO THE INVENTION

When a gyrostabiliser is used in a marine vessel to attenuate rolling motion, the rolling motion of the vessel induces flywheel precession that in turn produces a torque that opposes the rolling motion. This means that the induced flywheel precession is always in an appropriate phase to attenuate rolling motion (if the precession does not exceed 90°). Depending on the resistance to precession caused by the mechanical arrangement, when the rolling rate of rotation (roll rate) exceeds a certain level, the induced precession torque will cause the flywheel to precess through more than 90° (over-precess). This causes instability in the roll resisting torque produced by the flywheel as it momentarily becomes zero. If the resistance to precession is great enough to prevent induced over-precession during peak input events, the stabilising effect during more common events will be severely limited. It is therefore desirable to provide a gyrostabiliser control system to either vary the resistance to precession, or actively control the flywheel precession motion of the gyroscope.

There are many known gyrostabiliser control systems, from the manual precession axis brake actuated by a lever to active control of the precession angle in dependence typically on sensed vessel roll motion and gyroscope precession motion. The manual precession axis brake, first proposed by Schlick in 1904 and described by White in 1907, required manual intervention to prevent over-precession in wave environments outside a small range of design conditions.

The American company Sperry then developed a system that addressed the problem of the Schlick gyroscope by using an electric motor controlled by switches and a small gyroscope to control the precession of the main gyroscope. In this system the rate of precession was proportional to the roll rate of the vessel. Although the performance of these prior art systems was remarkable in some wave environments, (up to 95% roll reduction), the precession control systems were not able to adapt to varying wave conditions, so the performance was limited by simplistic precession torque controls. With the invention of lighter and cheaper fin stabilisers, which work well when a ship is at speed allowing hydrodynamic lift to be produced by the fins, interest in gyrostabilisers waned.

Gyrostabilisers have particular benefits for applications where the vessel has zero or low forward speed, when hydrodynamics based systems have little or no effect. Several applications including, but not limited to, patrol boats, luxury motor yachts, offshore floating production systems and offshore work boats all have significant operational roles at low or zero speed. These applications are driving renewed interest in revisiting gyrostabilisers for controlling wave induced ship rolling motion.

As a result, there have been proposed more complex control systems for gyrostabilisers to provide improved vessel motion attenuation performance over a wide range of operating conditions. For example, in WO 2009/009074, Rubenstein and Akers disclose a control strategy using attitude and angular rate sensors for both the vessel and the gyrostabiliser to produce a feed forward component. This is used along with a feedback component, a mode input (indicative of current events such as launching, parked or underway at various speeds) and an anticipation of the effect of the intended control (when applied to the gyrostabiliser and/or other vessel stabilising devices) to produce a resource allocation vector for the gyro and any other control means.

By actively controlling the precession of the gyrostabiliser flywheel, safe and effective performance across a wide range of operating conditions can be achieved. Active control of the precession requires sensor feedback for use as process control variable(s). If a process control variable becomes unavailable to the control system due to sensor error, loss of system power or other failure, the active control system will cease to operate. For actively driven gyrostabilisers, this will result in immediate loss of the stabilising influence of the gyrostabiliser, which risks the safe and/or comfortable operation of the vessel.

With the provision of increasing numbers of sensors to permit more complex gyrostabiliser control algorithms that are more responsive to changing sea states and vessel motion, the risk of one or more sensors failing is increased.

The present invention was developed with a view to providing a gyrostabiliser control system and method that is responsive to various and changing sea state and vessel motion to provide vessel rolling motion attenuation over a wide range of operating conditions and that minimises the number of sensors required for deriving a process control variable(s).

References to prior art in this specification are provided for illustrative purposes only and are not to be taken as an admission that such prior art is part of the common general knowledge in Australia or elsewhere.

SUMMARY OF THE INVENTION

According to a first aspect of the present invention there is provided a gyrostabiliser control system for stabilising marine vessel motion induced by excitation forces that produce roll motion, the control system comprising:

a first sensing means for sensing the precession of a flywheel of the gyrostabiliser;

a control means for generating a control signal aimed at maximising the range of the precession of the gyrostabiliser flywheel until it is estimated, based on the sensed precession, that the precession will exceed a predefined limit; and, an actuator responsive to the control signal for applying a precession control torque to the gyrostabiliser flywheel whereby, in use, adaptive control of the vessel motion based only on the precession of the gyrostabiliser flywheel can be achieved.

Preferably the actuator applies only a braking precession control torque to the gyrostabiliser flywheel, as this eliminates the requirement for external motive power to be supplied to the actuator to operate the system and this is considered advantageous. Accordingly, the precession control torque may be a resistive control torque, such that the actuator does not provide motive power to the flywheel about a precession axis. Alternatively, the actuator responsive to the control signal for applying a precession control torque to the gyrostabiliser flywheel may provide a precession axis damping control signal that acts only to resist the induced precession motion of the flywheel. Alternatively or additionally, the control signal may be a flywheel precession axis resistance gain, said gain being gradually decreased to allow the flywheel to develop as much induced precession as possible whilst not exceeding a predefined maximum precession angle range. Alternatively, a driving precession control torque may be applied.

Typically the control means employs an automatic gain controller (AGC). The AGC may work in series (or in parallel) with a precession rate limiting controller and/or a precession angle limiting controller. Preferably the AGC has a precession braking gain factor that is (continuously or gradually) ramped down so as to let the gyrostabiliser flywheel develop as much precession as possible within a predefined precession angle range.

Preferably when it is estimated that a derived process control variable (based on the precession angle and/or its derivatives) will exceed a predefined limit, the AGC incrementally increases the gain by a set amount or by an amount proportional to an estimated overshoot, so as to provide an increased braking precession control torque to the gyrostabiliser flywheel precession axis with the aim of preventing the defined precession angle limit from being exceeded. The control system may run a predictive model of said derived process control variable to allow the AGC gain to be varied based on an estimated future state of the derived process variable.

A precession angle limiting control function may act in series or parallel with the AGC to prevent the precession angle from exceeding a predefined limit. Alternatively or additionally, a precession rate limiting control function may act in series or parallel with the AGC to prevent the precession rate from exceeding a predefined limit.

Preferably, after the AGC has increased the gain, it again gradually ramps down the gain so as to allow the gyrostabiliser flywheel to again develop as much precession range as possible.

The first sensing means may sense precession angle. The control means may estimate precession rate and/or acceleration as additional process control variables. Alternatively or additionally, the control system may further include means for sensing the precession rate as an additional process control variable. If means are provided for sensing the precession rate, then the control system may use the sensed precession rate to estimate the precession angle in the event of a failure of the first sensing means, said estimate of the precession angle being substituted in place of the sensed precession angle.

According to a second aspect of the present invention there is provided a gyrostabiliser control method for stabilising marine vessel motion induced by excitation forces that produce roll motion, the control method comprising:

sensing the precession of a flywheel of the gyrostabiliser;

generating a control signal aimed at increasing the precession of the gyrostabiliser flywheel until it is estimated, based on the sensed precession, that the precession will exceed a predefined limit; and, applying a precession control torque to the gyrostabiliser flywheel responsive to the control signal whereby, in use, active adaptive control of the vessel motion based only on the precession of the gyrostabiliser flywheel can be achieved.

The step of applying a precession control torque may include providing a precession axis braking torque. In this case, no motive power is supplied about the precession axis.

The step of generating a control signal may employ Automatic Gain Control (AGC) which operates with a gain factor that is gradually decreased to allow the flywheel to develop as much induced precession as possible within a predefined precession angle range.

The AGC may include the step of increasing the (damping) gain factor when a derived process variable (which may be a function of precession angle and/or rate) exceeds a predefined limit, then continues to ramp the gain down until the process variable exceeds the limit again. The control method may include the step of running a predictive model of the derived process variable to allow the AGC gain factor to be varied based on estimated future state of the derived process variable.

The control method may include the step of limiting the precession angle in series (or in parallel or in any function) with the step of decreasing or increasing the AGC gain factor to prevent the precession angle from exceeding a predefined limit. Additionally or alternatively, the control method may include the step of limiting the precession rate in series (or in parallel or in any other function) with the step of decreasing or increasing the AGC gain factor to prevent the precession rate from exceeding a predefined limit. For example when the precession angle or rate (or a function of precession angle and/or rate) exceeds a predefined limit, a high gain signal may be added (in series or in parallel or in any other function) to the AGC gain factor to prevent the precession angle and/or rate from exceeding predefined limits. This is to protect the gyrostabiliser mechanism from over precession or from generating an excessive force and permits the use of an AGC control which may not itself respond rapidly enough to large random occurrences. When limiting precession angle, the high gain signal may be added only when the precession angle is approaching a predefined limit, preventing the high damping resulting from a high gain command signal from resisting the precession angle returning to a preferred range.

According to a third aspect of the present invention there is provided a hydraulic circuit for controlling the precession axis of a gyrostabiliser, the hydraulic circuit comprising:

at least one hydraulic cylinder connected about the precession axis of the gyrostabiliser and deflecting with precession motion of the gyrostabiliser, a damping pressure portion;

a flow control portion; and a fluid supply portion, wherein the at least one hydraulic cylinder is connected to the flow control portion of the hydraulic circuit by the damping pressure portion of the hydraulic circuit such that fluid flows in a single direction from the hydraulic cylinder to the flow control portion, and the flow control portion of the hydraulic circuit is connected to the hydraulic cylinder by the fluid supply portion of the hydraulic circuit such that fluid flows in a single direction from the flow control portion to the hydraulic cylinder.

Advantageously this provides a circuit in which oscillatory motion of the precession axis causes the cylinders to act as a single flow direction hydraulic pump.

The flow control portion may include an array of control valves. The array of control valves may include at least two parallel flow paths. The array of control valves, or at least one of said flow paths may include a proportional control valve. The flow through the flow control portion of the circuit may be varied according to a control gain signal from a gyrostabiliser control system.

The proportional control valve may be electronically controlled (i.e. in response to a control gain signal). A normally closed type flow control valve may be provided in series with the proportional control valve. During normal operation the normally closed valve may be signalled to remain open, including the electronically controlled proportional flow rate control valve in the flow circuit, but closes in the event of a loss of power or a sensed control system error.

The array of control valves, or at least one of said flow paths may include a fixed or manually adjustable flow rate control valve to allow a default flow damping level to be defined. A normally open type flow control valve may be provided in series with the fixed or manually adjustable flow rate control valve. During normal operation the normally open valve may be signalled to remain closed, so that the fixed or manually adjustable flow rate control valve is isolated from the circuit. In the event of a loss of power or the sensing of a control error, the normally open valve will open and introduce the fixed or manually adjustable valve into the flow circuit.

One of said flow paths may provide a pressure relief valve that provides over-pressure protection for the hydraulic circuit in the event that the pressure drop created across either the fixed or manually adjustable valve or the electronically controlled valve exceeds a predefined safe level.

This hydraulic circuit enables the fault tolerant fall-back to a fixed or manually adjustable damping level in the event that a sensor fault is detected, or that power to the control system is lost.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the gyrostabiliser control system and method, given by way of example only, with reference to the accompanying drawings, in which.

DETAILED DESCRIPTION OF PREFERRED EMBODIMENTS

Figure 1:
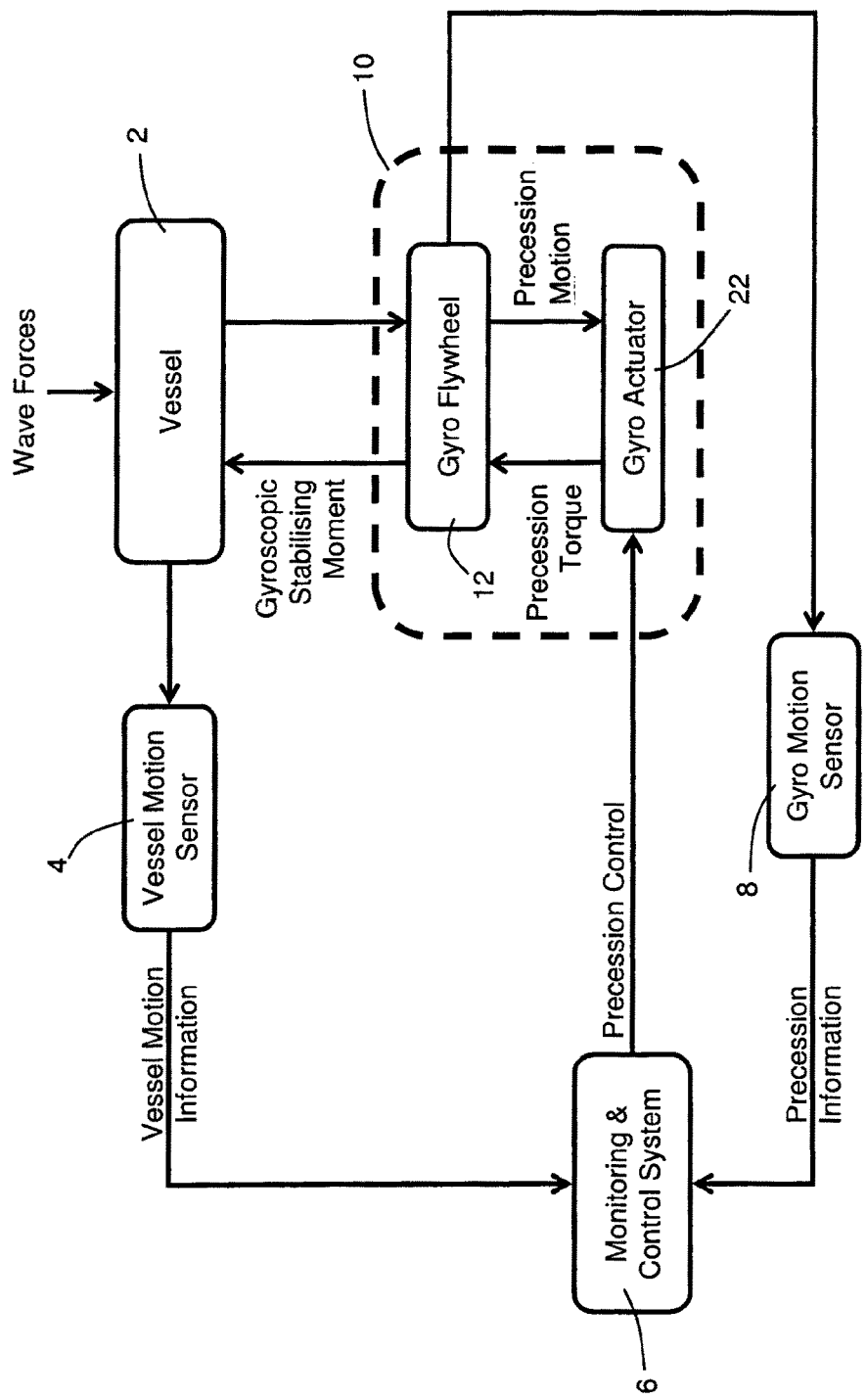
FIG. 1 is a schematic diagram illustrating the general architecture of a gyrostabiliser control system.
Figures 2, 3:
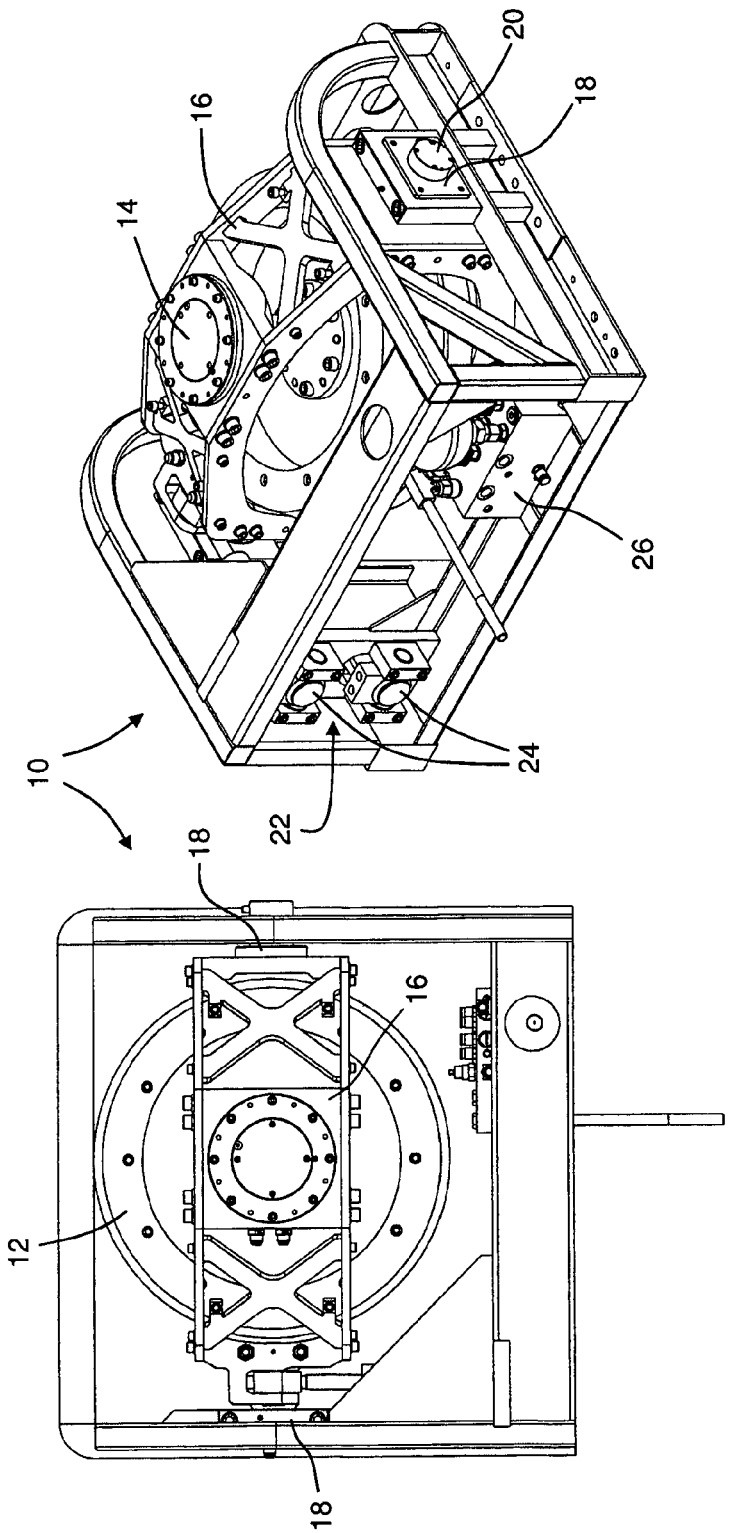
FIG. 2 is a top plan view of a preferred embodiment of a gyrostabiliser in accordance with the invention.
FIG. 3 is a top rear perspective view of the gyrostabiliser of FIG. 2.
Figure 4:
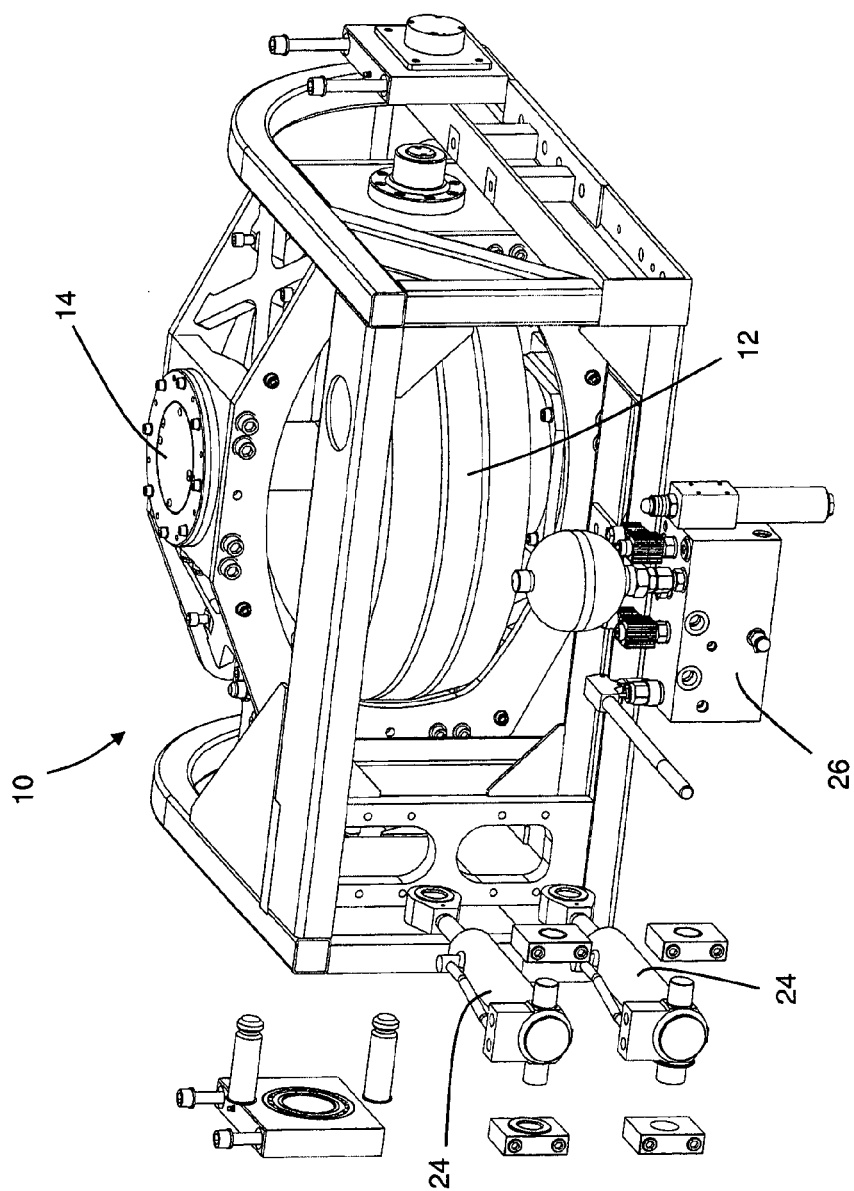
FIG. 4 is similar to FIG. 3 except that some of the components of the gyrostabiliser are shown in exploded view for clarity.
Figure 5:
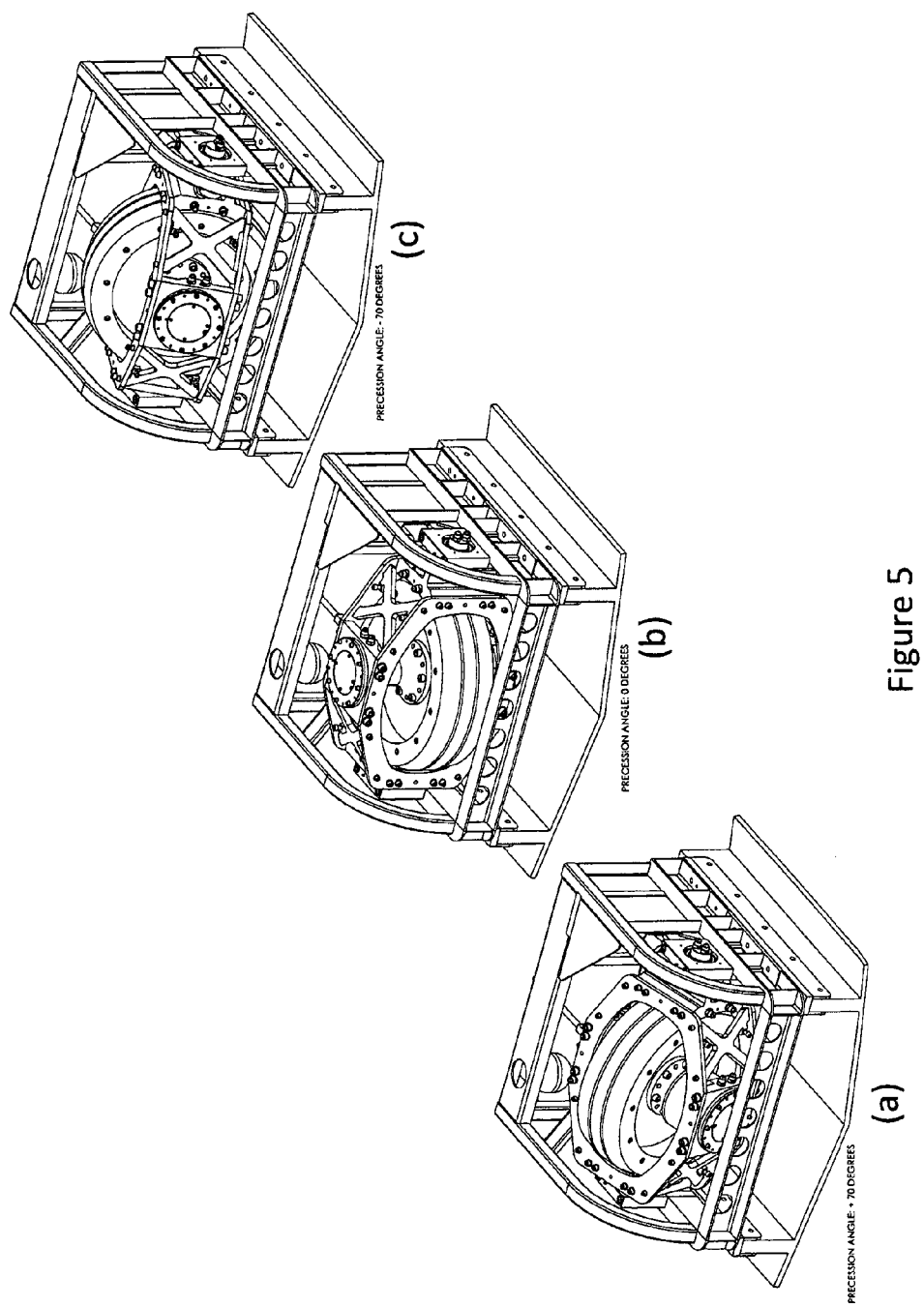
FIG. 5(a), (b) and (c) are top front perspective views of the gyrostabiliser of FIG. 2 showing the gyroscope at three different precession angles, namely +70°, 0°, and −70° respectively.

Throughout this specification the term "vessel" refers to a marine floating platform, typically a boat, yacht, barge, ship or submarine, which is subject to oscillating motion due to environmentally induced excitation forces that produce roll motion. The term "roll motion" refers to the rolling motion of the vessel including any or all derivatives thereof, but more broadly refers to any oscillating motion of the vessel that it is desired to be attenuated. FIG. 1 illustrates in simplified form the typical architecture of a gyrostabiliser control system utilising both vessel motion and precession axis measurements as process control variables. The motion of the vessel 2 is transferred to the flywheel 12 of a gyrostabiliser 10, and the precession action of the flywheel 12 produces a gyroscopic stabilising moment that counteracts the moment induced by the waves. Gyroscopic flywheels have two degrees of freedom: spin and precession. By conservation of angular momentum due to spin and the location of the vessel hull, the flywheel 12 produces a gyroscopic roll moment proportional to the product of the flywheel's spin angular momentum (inertia×angular velocity) and precession rate. The spin rate is generally constant, but this can also be controlled. Hence the larger the precession rate of the flywheel, the larger the gyroscopic stabilising moment produced on the vessel. However, the precession must be limited to ensure maximum mechanical loads and other physical constraints are not exceeded, and to prevent excessive precession angles where the effective stabilising torque is reduced but non-useful torques in other planes become significant. The limiting of the precession is achieved by the gyro-actuator 22. The gyro-actuator 22 is typically either a hydraulic, mechanical, electrical or a combination system that provides a torque about the precession axis.

The action of the gyro-actuator 22 is regulated by a monitoring and control system 6. A vessel motion sensor 4 provides roll angle or roll rate measurements to the monitoring and control system 6. A gyro motion sensor 8 provides precession angle measurements to the monitoring and control system 6. The monitoring and control system 6 processes the measurement information and produces appropriate control commands to the gyro-actuator 22 so as to limit the precession rate whilst maximising the roll reduction.

A preferred embodiment of a gyrostabiliser 10 in accordance with the present invention is illustrated in FIGS. 1 to 4. The gyrostabiliser 10 comprises a flywheel 12 (which may be sealed inside an enclosure) with a vertical spinning axis. The spinning axis is retained by spin bearings 14 located below and above the flywheel 12. The flywheel 12 and its spin bearings 14 are mounted within a structural flywheel cage 16, which is itself mounted on a set of gimbal bearings 18 which provide a single axis degree of rotational freedom (precession axis). The gyrostabiliser 10 is either mounted on a vessel such that the flywheel spinning axis is vertical at zero precession angle, and the precession axis is aligned such that it lies in a plane containing the roll motion to be attenuated (athwartships on a ship), or such that the flywheel spinning, axis is horizontal at zero precession angle, and the precession axis is aligned such that it lies in the plane containing the roll motion to be attenuated (vertical in a ship when roll motion is being attenuated by the gyrostabiliser). Both arrangements can be controlled by the methods described in this specification.

The speed of rotation of the flywheel 12 is controlled by an electric motor controller. Due to the gyro-dynamics of the gyrostabiliser 10, vessel rolling motion induces the flywheel cage 16 to 'precess'. The induced precession motion is in phase with the vessel rolling motion. As the cage 16 precesses, a torque is generated by the spinning flywheel 12, which is perpendicular to the plane containing the precession axis and the spinning axis. This will be referred to as the "gyro-torque". As noted above, the gyro-torque is proportional to the product of the flywheel polar moment of inertia, the spinning speed and the rate of precession.

It follows that for a given period of motion defined by the vessel rolling period, an increased angular range of precession will produce an increased maximum precession rate and therefore a maximum gyro-torque. As the precession rotation passes through zero precession angle, the gyro-torque acts completely in the opposite sense to the roll motion of the vessel. The gyro-torque will act to reduce the roll motion. However as the cage 16 precesses away from zero precession angle the gyro-torque will have components acting in the plane of the roll motion, and also in an orthogonal plane (the yaw plane for a vertical axis flywheel configured for roll reduction, and the pitch plane for a horizontal axis flywheel configured for roll reduction). If the precession motion is not controlled or is poorly controlled, in some circumstances, the component acting in the yaw axis does not contribute to rolling motion reduction and may have negative impacts on the directional control of the vessel, or cause undesirable pitching motion.

In some circumstances the range of precession oscillation will exceed +/−90°. When the precession angle reaches 90°, the torque generated by the precessing flywheel 12 acts entirely in the yaw axis and therefore does not oppose the wave and induced rolling torque acting on the vessel. So it can be seen that there is a compromise between achieving maximum torque in the opposite sense to the roll motion, and limiting the precession angular range to ensure that a significant component of the gyro-torque is acting to oppose the vessel rolling motion. One of the key tasks of the control system for the gyrostabiliser 10 is to apply a precession axis control torque to limit the precession motion angular range to within preset limits and to ensure that the rate of precession does not exceed a preset value.

A gyro motion sensor 8, for sensing the precession of the flywheel 12, is provided in the form of an inductive angular position sensor 20. A magnetic transducer is mounted in the precession shaft end, and the sensor 20 is mounted axially at the end of the shaft.

The gyro-actuator 22 is provided for applying a torque to flywheel cage 16 about the precession axis. In this embodiment the gyro-actuator 22 is an hydraulic system comprising a pair of hydraulic cylinders 24 connected between a quadrant mounted on the precession shaft and the foundation supports for the gyrostabiliser 10. The two hydraulic cylinders 24 are valved such that as the cage 16 oscillates about the precession axis, the pair of cylinders 24 acts as a hydraulic pump, which pumps the hydraulic fluid around a hydraulic control circuit. By controlling the restriction of a flow control valve, the torque load on the precession axis required to pump the fluid across the valve varies. An hydraulic control manifold 26 is provided for controlling the flow of hydraulic fluid, and contains two electrically controlled valves. By varying the flow control setting the precession axis damping can be varied.

Figure 6:
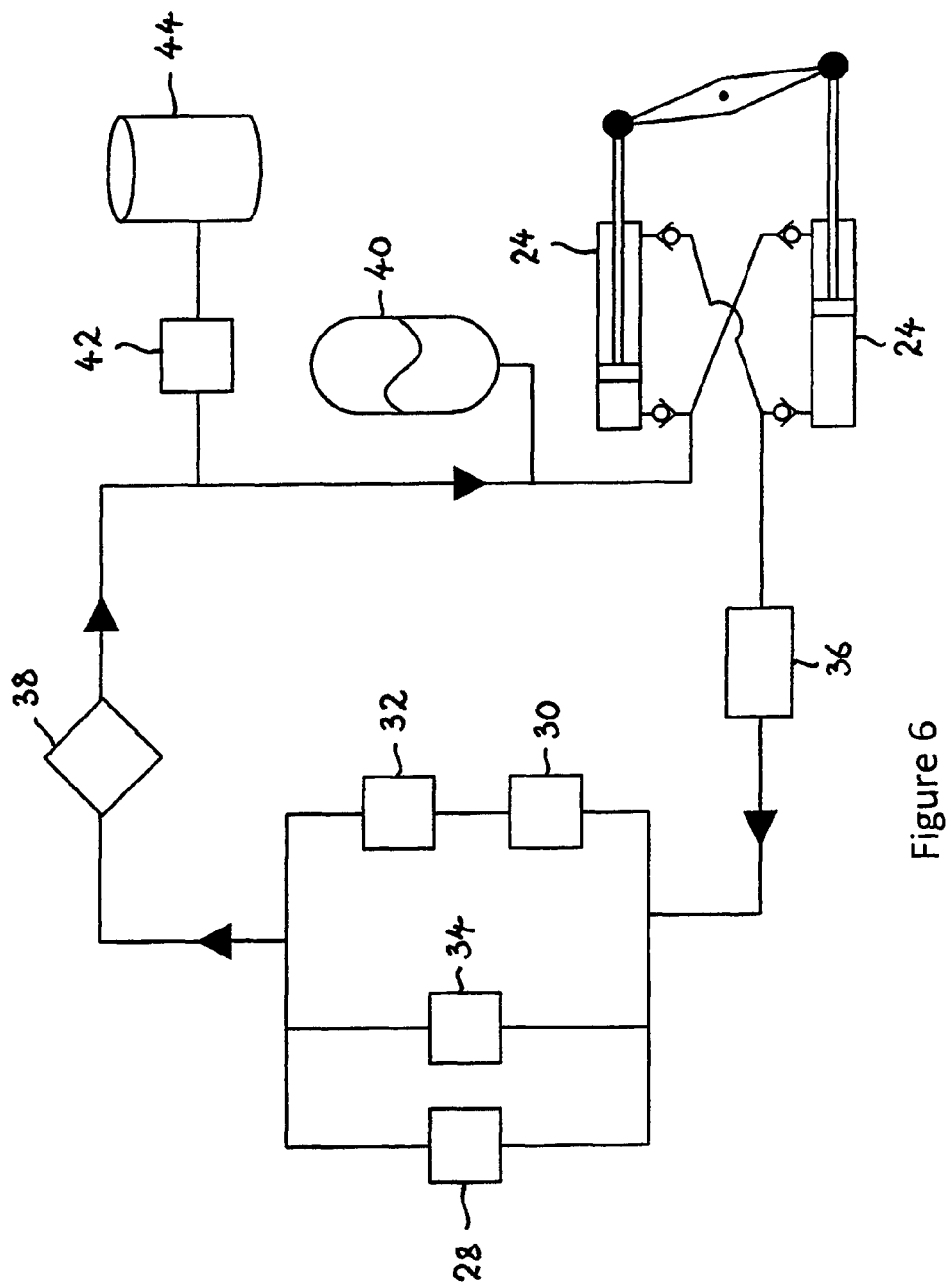
FIG. 6 is a simplified circuit diagram of a hydraulic control circuit for the gyrostabiliser of FIG. 2.

FIG. 6 is a simplified circuit diagram of a hydraulic control circuit for the gyrostabiliser. The hydraulic control circuit is designed such that the hydraulic cylinders 24 pump fluid around a circuit in the direction indicated by the arrows. An electronically controlled proportional (or servo) flow control valve 28, which is normally closed (when not energised), is located in-line. In normal operation the hydraulic oil is pumped across the proportional flow control valve 28, which restricts oil flow to create a variable resistance to precession. During normal operation of the gyrostabiliser 10 the proportional control valve 28 will be energised open by an amount determined by the controller. By varying the flow settings on the valve 28, the flow is restricted and the precession of the flywheel is damped. The proportional flow control valve 28 is controlled by a dedicated amplifier.

As a fail-safe measure, if power is removed from the control system (or if the system is in an error state), the proportional control valve 28 closes preventing flow across it. At the same time an electronically activated directional flow control valve (on/off) 30 opens to allow the oil to flow across a manually adjustable pressure compensated proportional flow control valve 32. The directional flow control valve 30 is connected in series with the manually adjustable proportional flow control valve 32, and both are connected in-line parallel to the electronically controlled proportional flow control valve 28. The directional control valve 30 is normally open (when not energised). To maintain this valve closed for normal gyrostabiliser operation, a solenoid coil is required to be energised.

A manually set pressure relief valve 34 is also provided in-line, parallel to the electronically controlled proportional flow control valve 28, to ensure that the pressure drop across the control valves does not exceed the hydraulic system design pressure. The set-point of this pressure relief valve effectively caps the precession control torque that is applied to the precession axis. A pressure filter 36 removes impurities from the hydraulic fluid in the circuit. If required, an hydraulic fluid heat exchanger 38 and an hydraulic fluid pressure accumulator 40 may be provided. In addition, an optional manual hydraulic fluid pump system 42 with inbuilt filtering, may be connected to a hydraulic control fluid storage device 44, to allow initial hydraulic system filling and system fluid refill or replacement as required.

The control of precession axis braking torque is executed in this embodiment within a mini-PLC (or equivalent) processor module. Electrical IO is managed with IO modules connected to the controller processor module. The proportional hydraulic flow control valve is preferably driven by an IO module, containing the Halcyon precession control algorithms which preferably uses roll angle and/or precession angle as feedback.

Figure 7:
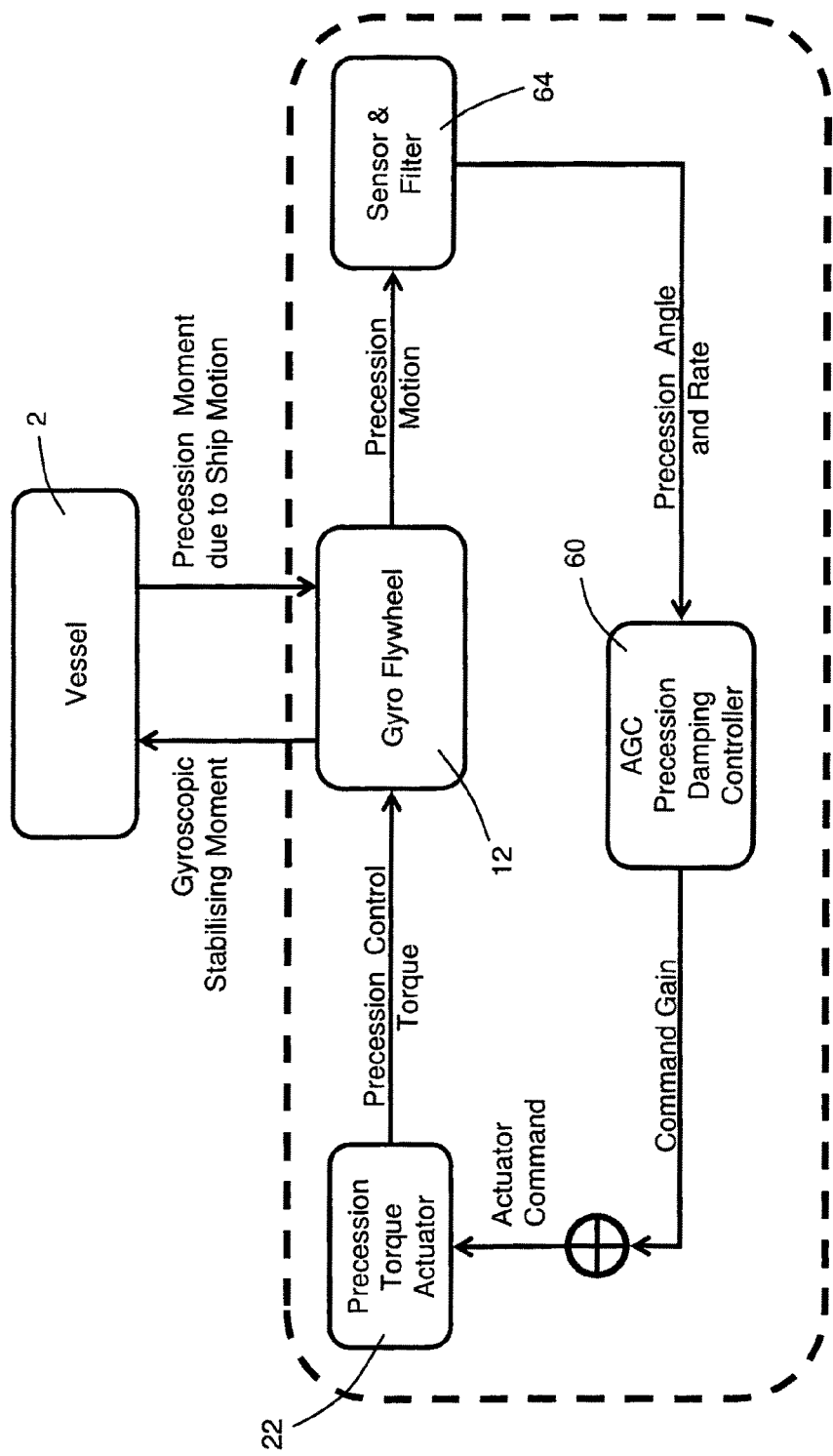
FIG. 7 is a control block diagram illustrating the preferred embodiment of a control system for a gyrostabiliser in accordance with the present invention that is based on active adaptive control using only measured precession angle and it's calculated derivatives as process control variables.
Figure 8:
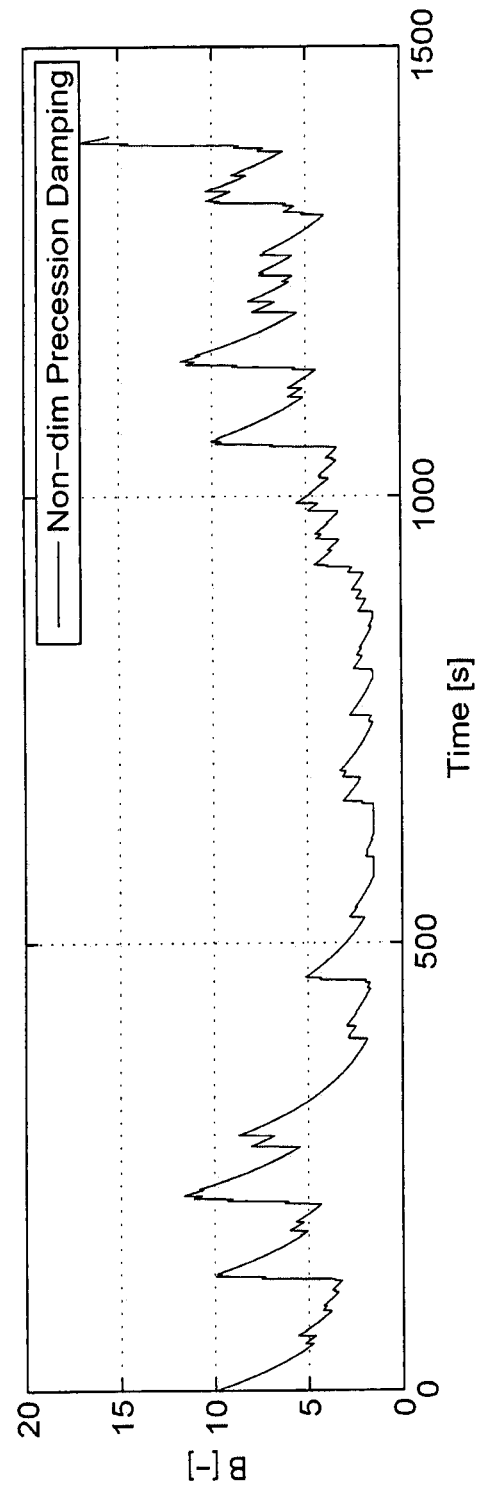
FIG. 8 illustrates adaptive gain evolution during a simulation scenario for the active adaptive control system of FIG. 7.

A first embodiment of a gyrostabiliser control system and method in accordance with the invention will now be described with reference to FIGS. 1 to 9. In some situations, vessel roll information may not be available to the control system. FIG. 7 is a schematic diagram of an active-adaptive control system in which gyrostabiliser control is maintained using gyro precession information only as feedback. By utilising only the flywheel precession angle and its calculated derivatives as a measured process control variable, the control system does not require information describing the environmental conditions. This limits the number of points of failure, simplifies and reduces the cost of production, whilst maintaining excellent motion attenuation performance. Depending on the resistance to precession caused by the mechanical arrangement, when the rolling rate of rotation (roll rate) exceeds a certain level, the induced precession torque will cause the flywheel, to precess through more than 90° (over-precess). This causes instability in the roll resisting torque produced by the flywheel as it momentarily becomes zero. The preferred control system and method of the invention controls the flywheel precession by applying an appropriate precession axis resistance torque only. This is significant as it eliminates the requirement to provide motive power to the actuator controlling the precession axis rotation. This reduces the power required to be supplied to the gyrostabiliser and hence makes it more efficient.

The control system of FIG. 7 employs an Automatic Gain Control (AGC) precession controller 60. AGC assumes a sinusoidal motion input with a fixed period (typically the natural period of roll motion of the vessel factored down to provide some conservatism) to enable estimation of the maximum precession rate. This means that AGC is good at estimating medium term gain, but not so good from cycle to cycle where in use the motion is not pure harmonic motion, but actually random motion in a narrow band of periods. For example, when the vessel changes heading, speed or when the wave height and/or period change, the roll motion changes, resulting in random precession motions. To accommodate or react to the random precession motions present in use, while the AGC precession controller 60 generates a precession torque control gain proportional to the precession rate, the precession angle and/or rate is used to adapt this gain on a wave to wave basis.

On initialisation, the system of FIG. 7 starts up with a predefined gain factor that is set to a high level to protect the gyrostabiliser from exceeding the maximum precession angle. However, in use the system of FIG. 7 operates with a gain factor that is always being gradually minimized (or ramped down) so as to let the gyro fly wheel 12 develop as much precession as possible—the higher the precession, the higher the roll stabilising moment. This continuous gain change provides adaptation to changes in sea state and sailing conditions. The system effectively predicts the likelihood of maximum precession being reached. Should this event be detected by the AGC precession controller 60, then the gain is rapidly increased so as to provide a braking precession torque. Once the event has passed, the system again attempts to gradually decrease the gain. This results in the saw-tooth characteristic illustrated in FIG. 8.

The detection of a potential maximum allowed precession angle (typically 60° to 70°) is done by monitoring the rate of precession and comparing it with a threshold value. Since the precession rate leads the angle, this achieves a prediction mechanism for the event of potential precession constraint violation. If the threshold value is reached and overshot, then the gain of the control system is increased in proportion to how much the threshold is overshot. However if the precession rate threshold in the AGC precession controller 60 is set to a conservative low level to avoid the precession angle exceeding the maximum allowed precession angle (for example to protect the gyrostabiliser mechanism from reaching the end of travel of the cylinders 24 in FIG. 6), then the actual precession angle during use is very limited, limiting the amount of motion attenuation provided by the gyrostabiliser.

Additionally, it should be noted that in the embodiment of the gyrostabiliser control system shown in FIG. 7, the AGC controller only predicts the likelihood of an event occurring using precession feedback information. The performance of the controller does not take into account that the gyrostabiliser 10 modifies the behaviour of the vessel 2. That is, the influence of the feedback structure of the system is not taken into account. Ignoring these effects increases the likelihood of two types of errors: false alarm and missed detection.

Figure 9:
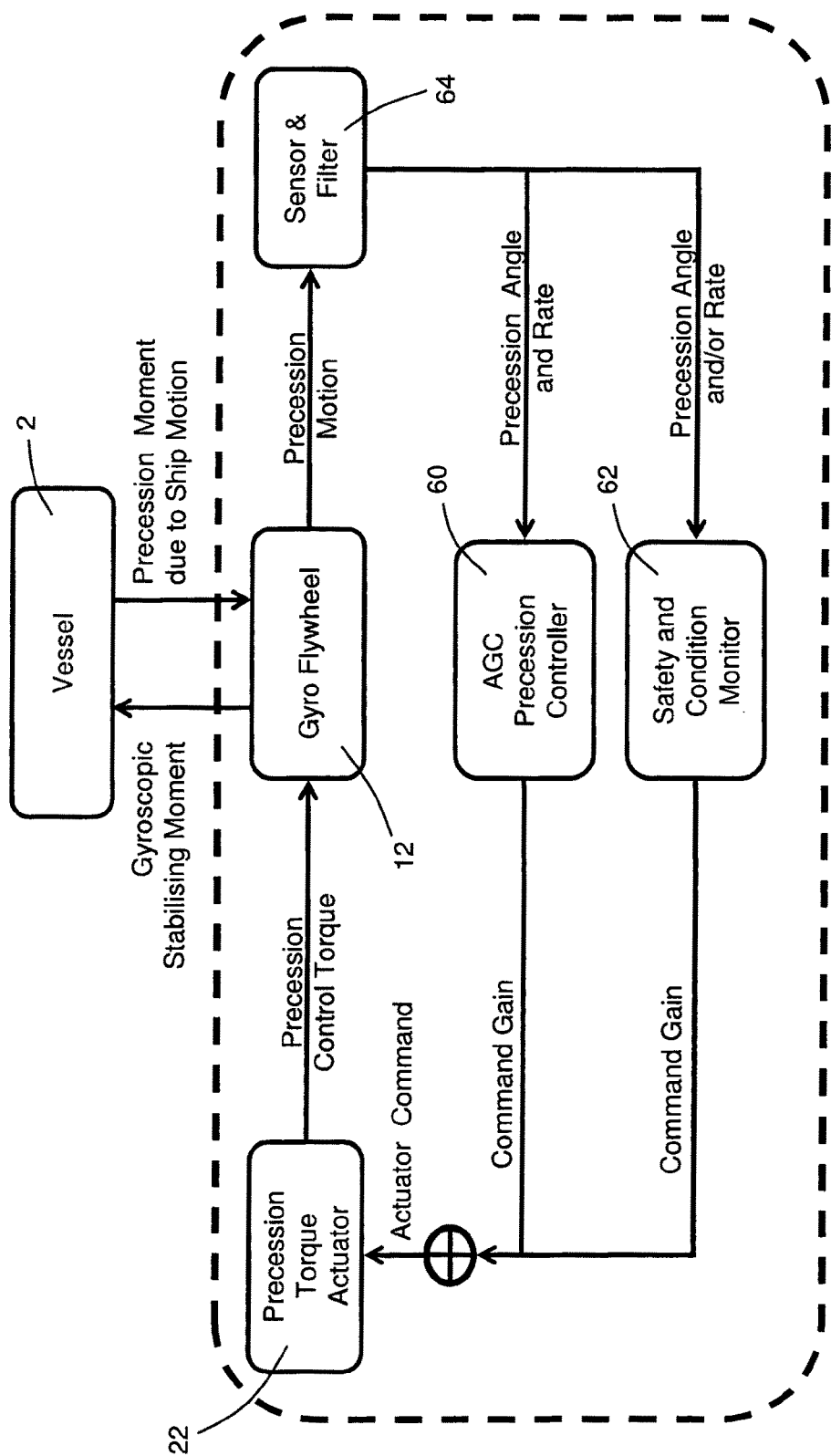
FIG. 9 illustrates the control system of FIG. 7 incorporating a safety and condition monitoring system which monitors and limits precession angle only, precession rate only or both.

In order to:
a) permit the precession rate threshold in the AGC controller 60 to be set to a more relaxed, higher lever to give more motion attenuation where possible, and
b) monitor for errors such as false alarm and/or missed detection, a safety and condition monitoring system 62 is provided as shown in FIG. 9. The safety and condition monitoring system may monitor and limit precession angle only, precession rate only or both.

Figure 10:
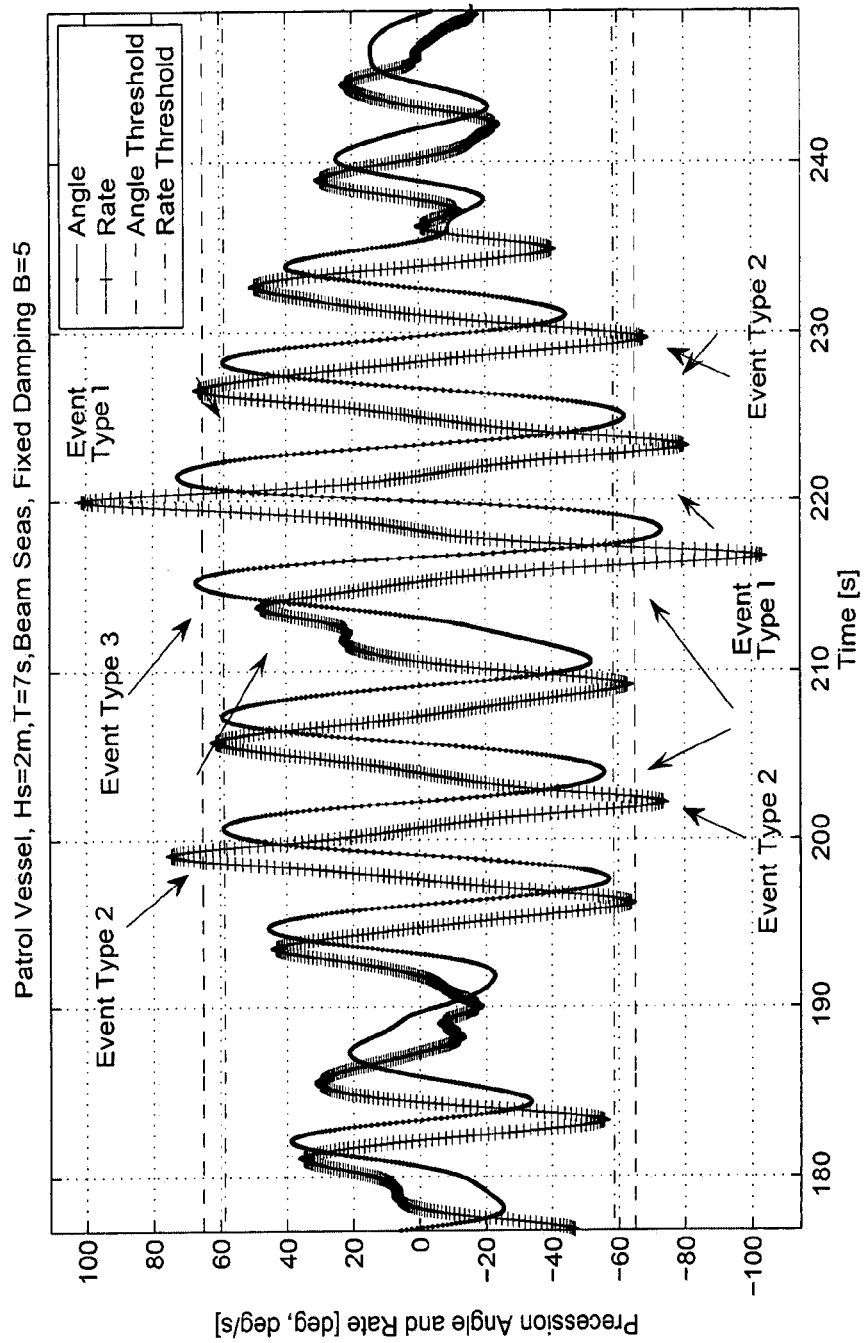
FIG. 10 illustrates three possible error event types resulting from implementation of the AGC without the angle and rate limiting controllers.

FIG. 10 shows three types of events which each exceed at least a rate or an angle threshold, including the false alarm and missed detection errors. In Event Type 1, both the rate and angle overshoot their respective thresholds.

In Event Type 2, the case of a false alarm, the rate overshoots the threshold but the angle does not, so if the safety and condition monitor 62 is only monitoring precession rate the gain will be increased unnecessarily. This would temporarily reduce the performance of the system with regards to roll reduction. However it can still be desirable to monitor and limit precession rate to limit peak torque and protect the gyrostabiliser mechanism from excessive loads.

Figure 11:
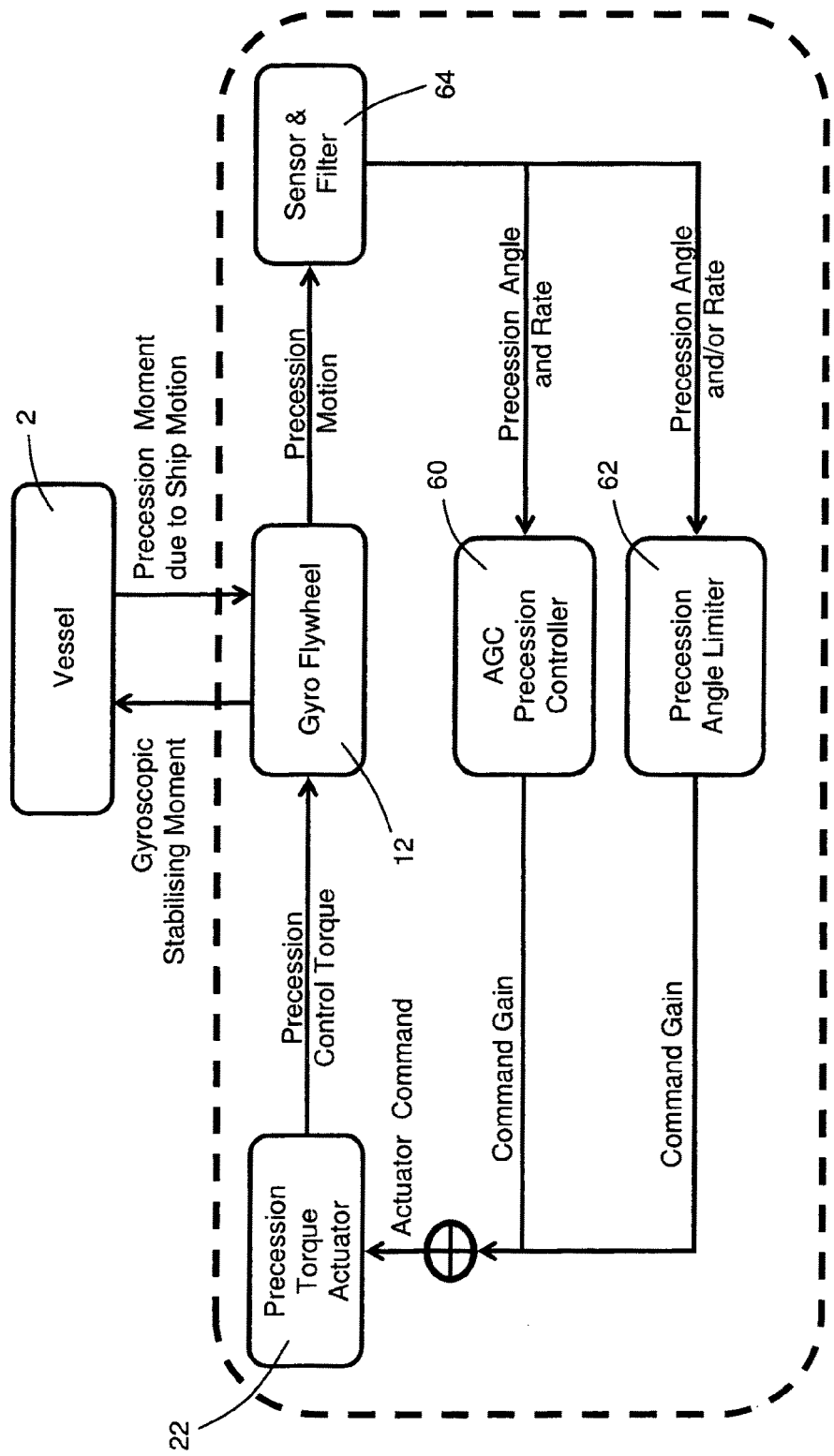
FIG. 11 illustrates the control system of FIG. 9 in which the safety and condition monitoring system effectively acts as a precession angle limiter.
Figure 12:
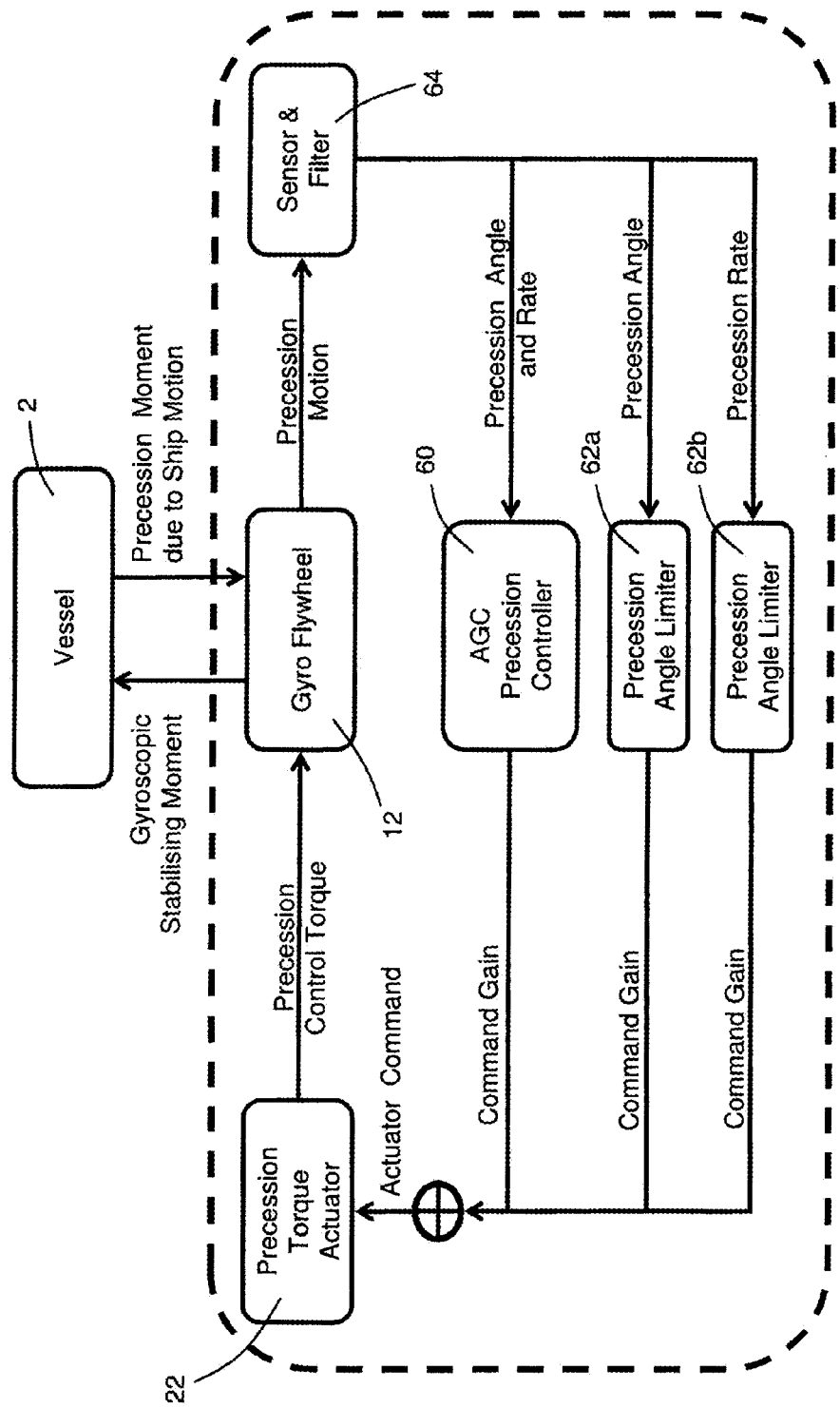
FIG. 12 illustrates the control system of FIG. 9 in which the safety and condition monitoring system effectively acts as both a procession angle limiter and precession rate limiter.

However Event Type 3, a missed-detection error (where the rate does not overshoot the threshold, but the angle does) may lead to the gyro flywheel reaching the precession travel limits. Therefore, the safety and condition monitoring system 62 should at least monitor precession angle as shown in FIG. 11 to detect this condition and increase the control command gain to apply a brake to the gyro precession. With this arrangement the safety and condition monitoring system is effectively acting as a precession angle limiter 62. Preferably the safety and condition monitoring system 62 monitors both precession angle and precession rate as shown in FIG. 12, and therefore is effectively acting as both a precession angle limiter 62a and a precession rate limiter 62b.

The angle and rate limiting control function blocks capture these errors producing a robust adaptive controller in conjunction with the AGC control function block.

The safety and condition monitoring system 62 acts on the gyro actuator 22 only in the event where the precession angle approaches a maximum (70°) at high speed, and the AGC precession controller 60 has not increased the actuator command to the necessary level (missed detection error). The safety and condition monitor can be integrated with the AGC or operate (at least in effect) in series or as shown in parallel, since it typically will produce a high gain signal when required, which when summed (by the summing block 64 for example) with the command gain from the AGC produces a high gain which signals an increase in precession control torque.

A sensor and filter 64 provides measurements of the precession angle only. These measurements are filtered to reduce noise and also to estimate the derivatives and integrals of the signal as required. When the gyrostabiliser is controlled by (only) braking of the precession axis, the active adaptive control discussed herein can be achieved using precession motion only as an input. If the precession axis is driven however, it is generally necessary to measure a vessel motion characteristic such as roll angle and/or rate.

Figure 13:
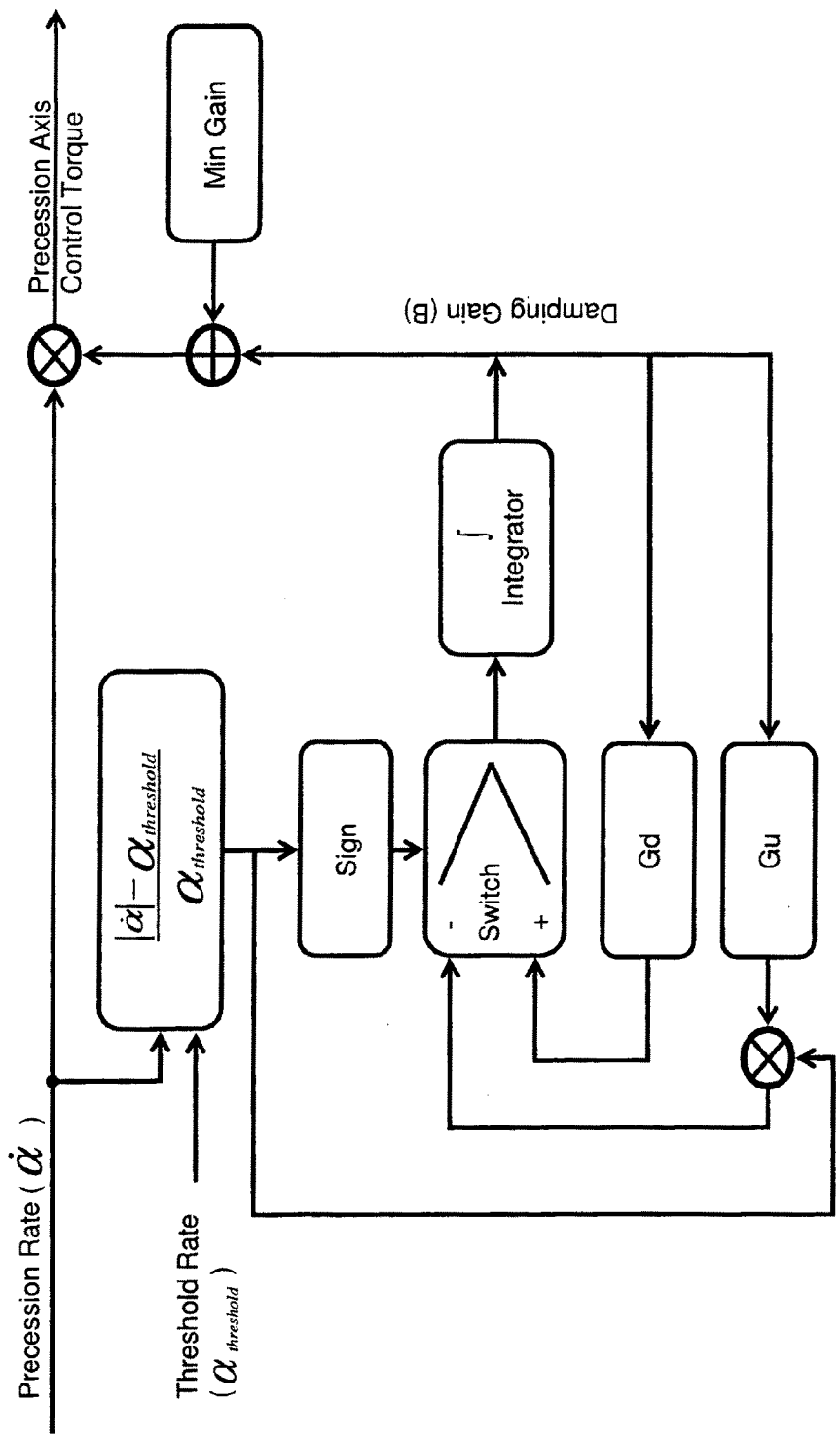
FIG. 13 is a block diagram schematic representation of a first example of an AGC adaptive precession controller; and, FIG. 14 is a block diagram schematic representation of a second example of an AGC adaptive precession controller.

FIG. 13 shows a block diagram schematic representation of a first example of the AGC active adaptive precession controller (item 60 in FIGS. 11 and 12). When the precession rate is less than the rate threshold, the angle overshoot will be negative. In this case the integrator is connected in a negative feedback loop and the gain will decay exponentially. However, if the precession rate overshoots the threshold, then the integrator is connected in a positive feedback loop while the rate overshoots. This is achieved by using the magnitude of the overshoot as a factor to compute the input of the integrator. The positive feedback ensures a very fast growth of the damping gain (B) which slows the precession of the gyro and prevents it from reaching a precession angle limit. Ideally the controller only uses the positive feedback for high (damping) gain as the precession angle is approaching a limit, reverting to decreasing or a lower (damping) gain as the precession angle is receding from that limit.

Figure 14:
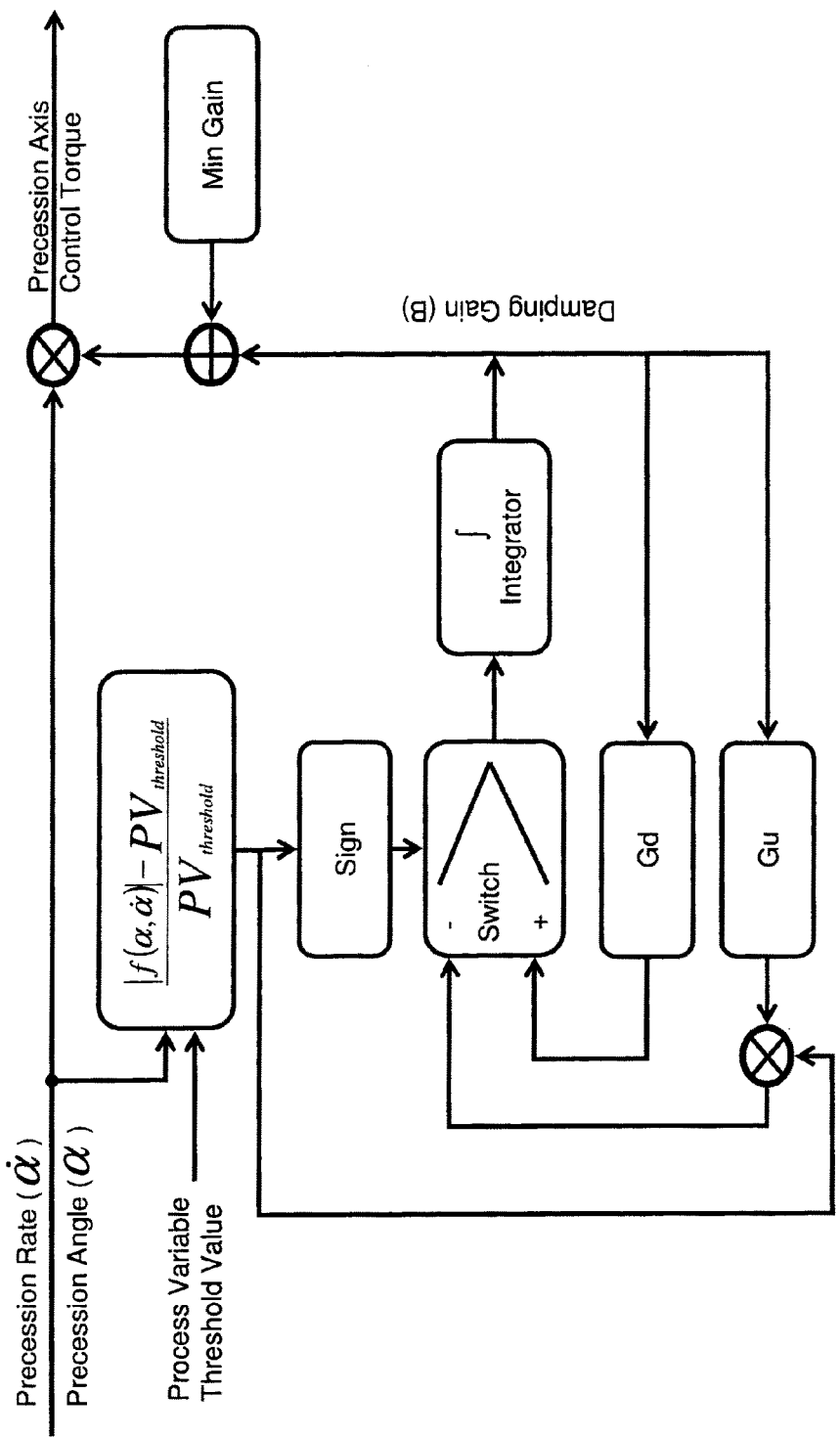

FIG. 14 shows a similar block diagram of a second example of the AGC active adaptive precession controller 60 using a derived process variable that is a function of the precession angle and/or rate in place of the precession rate and a process variable threshold in place of the precession rate threshold. In this case, the AGC increases the gain factor when the derived process variable exceeds the predefined process variable threshold. Optionally the control system runs a predictive model of the derived process variable to allow the AGC gain factor to be varied based on estimated future state of the derived process variable.

Optionally, the control system of FIG. 7 may also be supplied with information related to roll angle, to provide a mechanism for precession sensor fault accommodation. In normal operation, only the precession angle provided by the sensor 64 and the estimated precession rate are used. Should this sensor fail, information related to roll angle and rate can be used by an observer to model and estimate the precession motion, and the estimated values can be used in the AGC precession controller 60. In this case, the roll sensor is only used to reconstruct the precession information, but not to build a mathematical model for prediction. However it can be preferable to provide sensor fault tolerance simply through sensor redundancy, i.e. through the provision of multiple precession sensors.

Now that a preferred embodiment of the gyrostabiliser control system and method have been described in detail, it will be apparent that the described embodiment provides a number of advantages over the prior art, including the following:

(i) The active-adaptive control module provides good precession axis control based on the precession angle signal only, removing the requirement for a vessel motion sensor. This removes a point of failure from the system, simplifies the system and reduces cost.

(ii) The control strategy of maximising precession angles in phase with vessel rolling motion without exceeding precession angle or rate limits ensures that maximum gyro torque is generated without introducing spurious torques out of phase with the unstabilised rolling motion. This ensures that as environmental conditions change (waves, wind encounter angle etc), and as vessel loading configuration and speed change, the gyro-stabiliser control system adapts and provides maximum possible motion attenuating torque whilst avoiding undesirable effects such as out of phase accelerations, discontinuities at precession angles approaching 90 degrees and control system instability.

(iii) The control strategy of maximising precession angles in phase with vessel rolling motion without exceeding precession angle or rate limits is achieved without complex numerical predictions, providing a robust and high performance solution that is able to be implemented on a wide range of low cost numerical processors.

It will be readily apparent to persons skilled in the relevant arts that various modifications and improvements may be made to the foregoing embodiments, in addition to those already described, without departing from the basic inventive concepts of the present invention.

The invention claimed is:

1. A gyrostabiliser control system for stabilising floating vessel motion induced by wave action, the control system comprising: a first sensing means for sensing the precession of a flywheel of the gyrostabiliser; a control means for generating a control signal aimed at increasing the precession of the gyrostabiliser flywheel until it is estimated, based on the sensed precession, that the precession will exceed a predefined limit; and, an actuator responsive to the control signal for applying a precession control torque to the gyrostabiliser flywheel whereby, in use, adaptive control of the vessel motion based only on the precession of the gyrostabiliser flywheel can be achieved.

2. A gyrostabiliser control system as defined in claim 1, wherein the precession control torque is a resistive control torque, such that the actuator does not provide motive power to the flywheel about a precession axis.

3. A gyrostabiliser control system as defined in claim 1, wherein the actuator responsive to the control signal for applying a precession control torque to the gyrostabiliser flywheel provides a precession axis damping control signal that acts only to resist the induced precession motion of the flywheel.

4. A gyrostabiliser control system as defined in claim 1, wherein the control signal is a flywheel precession axis resistance gain, said gain being gradually decreased to allow the flywheel to develop as much induced precession as possible whilst not exceeding a redefined maximum precession angle range.

5. A gyrostabiliser control system as defined in claim 1, wherein the control means employs an automatic gain controller (AGC).

6. A gyrostabiliser control system as defined in claim 5, wherein the AGC has a precession braking gain factor that is ramped down so as to let the gyrostabiliser flywheel develop as much precession as possible within a predefined precession angle range.

7. A gyrostabiliser control system as defined in claim 6, wherein when it is estimated that a derived process control variable will exceed a predefined limit, the AGC incrementally increases the precession braking gain factor by a set amount or by an amount proportional to an estimated overshoot, so as to provide an increased braking precession control torque to the gyrostabiliser flywheel precession axis with the aim of preventing a predefined precession angle limit from being exceeded.

8. A gyrostabiliser control system as defined in claim 7, wherein the control system runs a predictive model of the derived process variable to allow the AGC precession braking gain factor to be varied based on an estimated future state of the derived process variable.

9. A gyrostabiliser control system as defined in claim 6, wherein a precession angle limiting control function acts in series or parallel with the AGC to prevent the precession angle from exceeding a predefined limit.

10. A gyrostabiliser control system as defined in claim 6, wherein a precession rate limiting control function acts in series or parallel with the AGC to prevent the precession rate from exceeding a predefined limit.

11. A gyrostabiliser control system as defined in claim 1, wherein the first sensing means senses precession angle.

12. A gyrostabiliser control system as defined in claim 11, wherein the control means estimates precession rate and/or acceleration as additional process control variables.

13. A gyrostabiliser control system as defined in claim 11, wherein the control system further includes means for sensing a precession rate as an additional process control variable.

14. A gyrostabiliser control system as defined in claim 11, wherein the control system further include means for sensing a precession acceleration as an additional process control variable.

15. A gyrostabiliser control system as defined in claim 13, wherein the control system uses a sensed precession rate to estimate the precession angle in the event of a failure of the first sensing means, said estimate of the precession angle being substituted in place of the sensed precession angle.

16. A gyrostabiliser control method for stabilising floating vessel motion induced by wave action, the control method comprising the steps of: sensing the precession of a flywheel of the gyrostabiliser; generating a control signal aimed at increasing the precession of the gyrostabiliser flywheel until it is estimated, based on the sensed precession, that the precession will exceed a predefined limit; and, applying a precession control torque to the gyrostabiliser flywheel responsive to the control signal whereby, in use, active adaptive control of the vessel motion based only on the precession of the gyrostabiliser flywheel can be achieved.

17. A gyrostabiliser control method as defined in claim 16, wherein the step of applying a precession control torque includes providing a precession axis braking torque and does not include supplying motive power about the precession axis.

18. A gyrostabiliser control method as defined in claim 16, wherein the step of generating a control signal employs Automatic Gain Control (AGC) which operates with a gain factor that is gradually decreased so as to let the flywheel develop as much precession as possible within a predefined range.

19. A gyrostabiliser control method as defined in claim 18, wherein the AGC includes the step of increasing the gain factor when a derived process variable exceeds a predefined limit, then continues to ramp the gain factor down until the process variable exceeds the limit again.

20. A gyrostabiliser control method as defined in claim 19, further including the step of running a predictive model of the derived process variable to allow the AGC gain factor to be varied based on an estimated future state of the derived process variable.

21. A gyrostabiliser control method as defined in claim 18, including the step of limiting a precession angle in series with the steps of decreasing or increasing the AGC gain factor to prevent the precession angle from exceeding a predefined limit.

22. A gyrostabiliser control method as defined in claim 18, including the step of limiting a precession rate in series with the steps of decreasing or increasing the AGC gain factor to prevent the precession rate from exceeding a predefined limit.

23. A gyrostabiliser control method as defined in claim 19, including the step of limiting a precession angle in series with the steps of decreasing or increasing the AGC gain factor to prevent the precession angle from exceeding a predefined limit.

24. A gyrostabiliser control method as defined in claim 19, including the step of limiting a precession rate in series with the steps of decreasing or increasing the AGC gain factor to prevent the precession rate from exceeding a predefined limit.

25. A gyrostabiliser control system as defined in claim 2, wherein the control signal is a flywheel precession axis resistance gain, said gain being gradually decreased to allow the flywheel to develop as much induced precession as possible whilst not exceeding a predefined maximum precession angle range.

26. A gyrostabiliser control system as defined in claim 3, wherein the control signal is a flywheel precession axis resistance gain, said gain being gradually decreased to allow the flywheel to develop as much induced precession as possible whilst not exceeding a predefined maximum precession angle range.

\* \* \* \* \*